April 17, 1934.  F. GEISE ET AL  1,955,329
SELECTIVE PROTECTION EQUIPMENT FOR ELECTRICAL LINES
Filed Feb. 5, 1932  2 Sheets-Sheet 1

WITNESSES:
C. J. Weller.
Geo. E. Harrison.

INVENTORS.
Fritz Geise and
Hermann Neugebauer.
BY
ATTORNEY

April 17, 1934.  F. GEISE ET AL  1,955,329
SELECTIVE PROTECTION EQUIPMENT FOR ELECTRICAL LINES
Filed Feb. 5, 1932    2 Sheets-Sheet 2
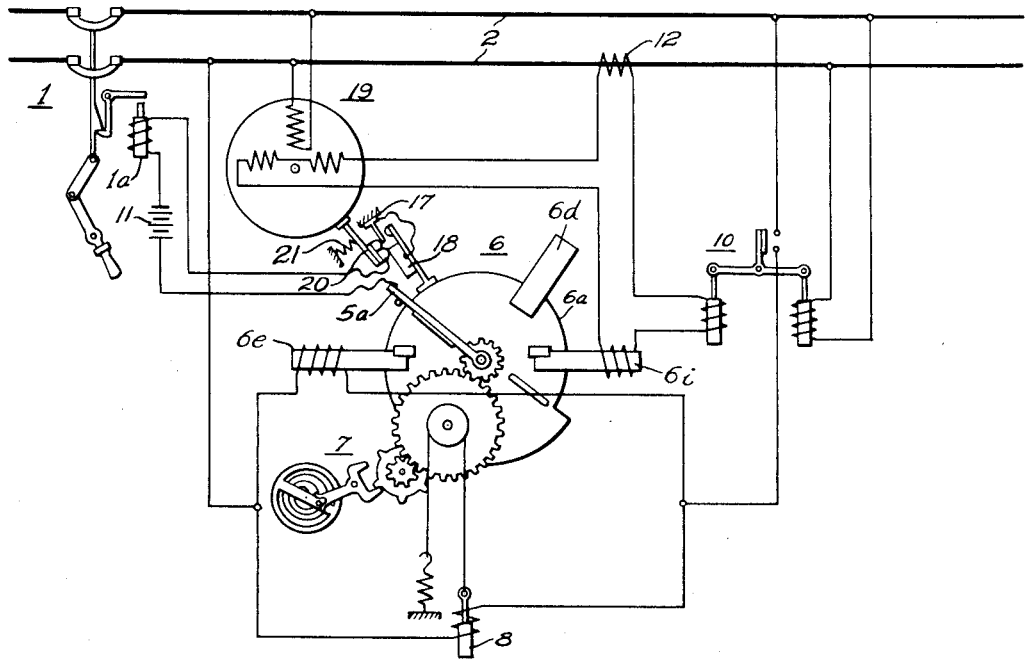
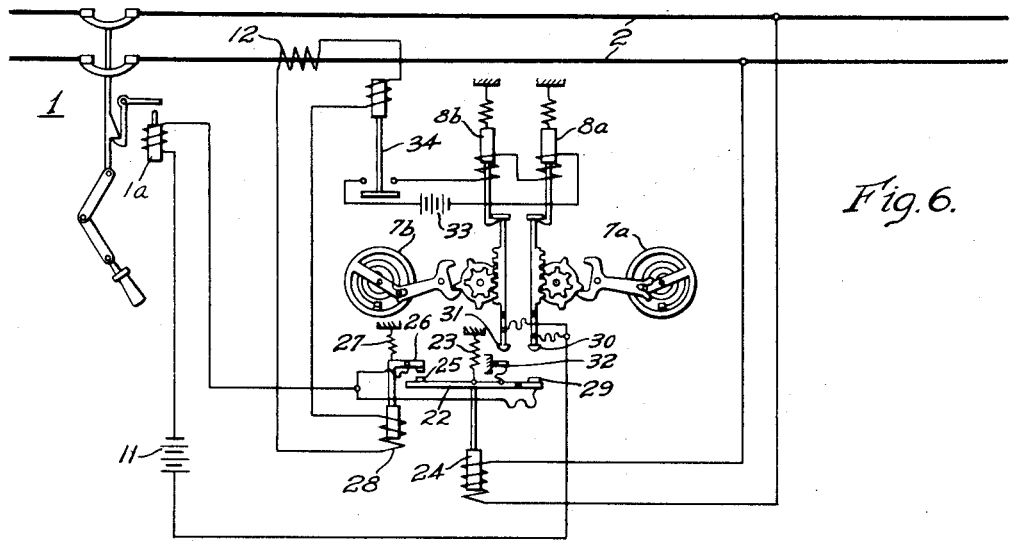
WITNESSES:
INVENTORS.
Fritz Geise and
Hermann Neugebauer.
BY
ATTORNEY Patented Apr. 17, 1934

1,955,329

UNITED STATES PATENT OFFICE 1,955,329

SELECTIVE PROTECTION EQUIPMENT FOR ELECTRICAL LINES

Fritz Geise, Berlin-Wilmersdorf, and Hermann Neugebauer, Berlin-Spandau, Germany, assignors to Westinghouse Electric and Manufacturing Company, a corporation of Pennsylvania Application February 5, 1932, Serial No. 591,116
In Germany February 12, 1931

7 Claims. (Cl. 175—294)

Our invention relates to protective apparatus for electric circuits and particularly to protective inverse time relays of the type in which the operating time of the relay is determined jointly by a fault-responsive element energized in accordance with an abnormal condition of the protected circuit and a timing element controlled independently of the fault condition.

Although not limited thereto, our invention is particularly applicable to impedance inverse time relays of the type in which a pair of contact members are separately driven by an impedance-responsive element and a constant-speed timing element, respectively, the operating time of the relay being the time required for engagement of the contact members. In one form of such relays known in the prior art, the impedance-responsive element is of the induction disc type and is provided with a pair of opposing driving magnets, which, under fault conditions, are energized in accordance with the current and voltage, respectively, of the protected circuit. The energizing circuit of the voltage-responsive driving magnet is normally open and is completed upon the occurrence of a fault by a starting relay, which also serves to initiate operation of the timing element.

In such impedance relays, the final position of the impedance-controlled contact member is determined by the ratio of current to voltage, that is, by the apparent impedance of the protected circuit. However, the effective torque tending to move the impedance-controlled contact member to its final position is determined by the excess of torque produced by the current-responsive driving magnet over that produced by the voltage-responsive driving magnet. It will be seen that for faults of the same impedance, the effective relay torque may vary considerably depending upon the magnitude of the fault current. If the connected generator capacity is high at the time of fault, the fault current for a given fault impedance and the effective relay torque will be high, and if the connected generator capacity is low, the effective relay torque for the same fault impedance will be low. As the damping forces applied to the impedance-responsive relay element must be sufficient to prevent excessive oscillation of the disc under conditions of high effective torque, the action of the impedance element may be comparatively slow under conditions of low effective torque. Because of this variation of effective torque, it has heretofore been necessary to design the timing element for comparatively low speeds, corresponding to long relay operating times, in order to prevent engagement of the timing contact member with the impedance-controlled contact member, before the latter has attained its final position.

It is an object of our invention to provide a novel protective relay of the type indicated above, which shall have characteristics suitable for sectionalized transmission or distribution systems, and which shall operate with comparatively short time delay.

Other objects of our invention will become evident from the following detailed description, taken in conjunction with the accompanying drawings in which:

Fig. 5 is a diagrammatic view of a directional impedance relay embodying our invention; and Fig. 6 is a diagrammatic view of a relay having overcurrent and undervoltage inverse time element characteristics, constructed in accordance with our invention.

Figure 1:
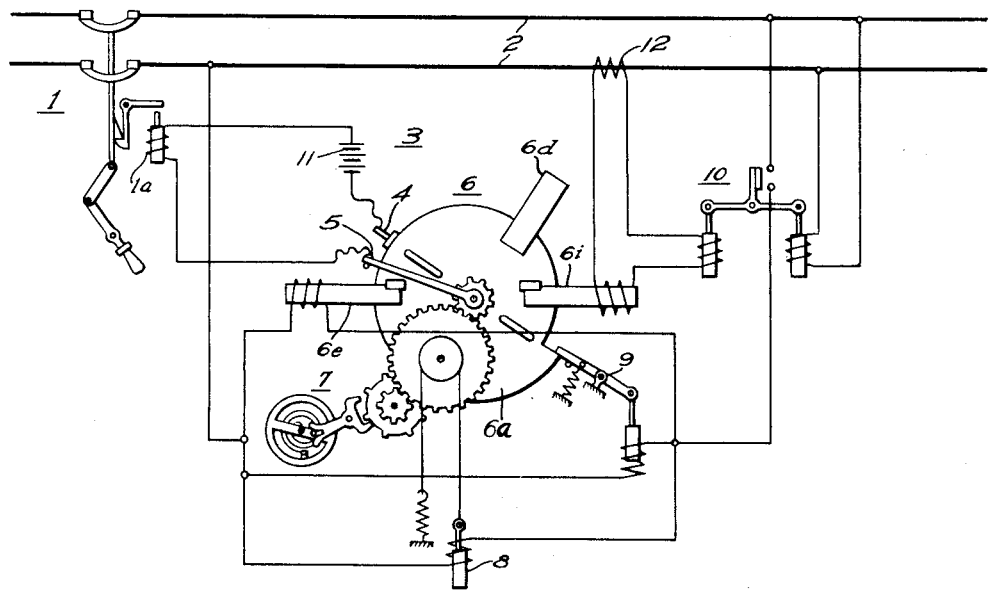
Figure 1 is a diagrammatic view of an impedance relay embodying our invention.

Referring to Fig. 1 of the drawings in detail, a circuit breaker 1 of any suitable type, having a trip coil 1a, is connected in an alternating-current circuit to be protected 2, in the usual manner.

The trip coil 1a is controlled by means of an impedance-responsive contact member 4 and a timing contact member 5 of a relay 3 constructed in accordance with our invention. The impedance-responsive contact member 4 is mounted to be driven by an impedance-responsive element 6, consisting of voltage and current driving magnets 6e and 6i, respectively, positioned to exert opposing torques on an induction disc 6a. The induction disc 6a may be eccentrically mounted, or preferably may be of non-circular form, such that every angular position of the induction disc within the operating range of the relay corresponds to a definite ratio of the torques exerted by the driving magnets 6e and 6i. During operation of the relay 3, as will be hereinafter more fully explained, the driving magnets 6e and 6i are energized in accordance with the voltage and current, respectively, of the protected circuit 2 to produce an angular deflection of the disc 6a dependent upon the impedance of the protected circuit 2. A damping magnet 6d is provided for damping the motions of the disc 6a in a manner well understood in the art.

The timing contact member 5 is mounted to be driven at substantially constant speed along the arc of travel of the contact member 4 by any suitable means, such as a clockwork mechanism 7. The clockwork mechanism 7 is provided with an electromagnetic release element 8 of any suitable type for initiating motion of the timing contact member 5 in the clockwise direction from a normal position shown in Fig. 1.

An electromagnetically released stop member 9 is provided for holding the induction disc 6a in an angular position corresponding to a definite value of impedance greater than zero, determined by the specific application of the relay. This value of impedance, for purposes of illustration, will be assumed as the impedance of the section of the circuit 2 to be protected by the relay 3.

The coils of the voltage driving magnet 6e, the electromagnetic release element 8 and the stop member 9 are controlled by contact members of a suitable starting relay 10, shown as of the impedance-responsive type.

A suitable source, such as a battery 11 is provided for the circuit of trip coil 1a, and any suitable means, such as a current transformer 12, is provided for energizing the current coils of the impedance-responsive element 6 and the starting relay 10 in accordance with the current in the circuit 2.

The operation of the apparatus shown in Fig. 1 may be set forth as follows: It is assumed that initially the circuit breaker 1 is closed, the voltage of the circuit 2 is normal, and that current within normal limits is flowing in the latter circuit. As the voltage-driving magnet 6e is deenergized, the current magnet 6i acts unopposed to maintain the induction disc 6a in engagement with the stop member 9.

Upon the occurrence of a fault which reduces the apparent impedance of the circuit 2 to a value within the operating range of the relay 3, the starting relay 10 closes to complete circuits for the coils of the voltage-driving magnet 6e, the release element 8 and the stop member 9. The stop member 9 operates to release the disc 6a, and the release element 8 acts to initiate operation of the clockwork mechanism 7.

The current magnet 6i and the voltage magnet 6e now act in opposition to rotate the induction disc 6a to an angular position corresponding to the impedance of the circuit 2 from the relaying point to the point of fault. For faults within the section of the circuit 2 controlled by the relay 3, the contact member 4 moves toward the timing contact member 5 and engages the latter in a comparatively short time interval. For faults beyond the protected section, the contact member 4 moves clockwise, away from the contact member 5, to a final angular position determined by the impedance of the circuit 2 to the point of fault. The timing contact member 5 also moves clockwise at substantially constant speed until it engages the contact member 4 in the final position of the latter. Upon engagement of the contact members 4 and 5, a circuit for the trip coil 1a is completed, and the circuit breaker 1 is tripped open.

In the operation described above, it will be noted that the induction disc 6a moves through a comparatively small arc to positions corresponding to impedances of the order of the impedance of the section of the circuit 2 controlled by the relay 3. The angular oscillations of the induction disc in assuming its final position are correspondingly small for impedances of this order, and the time of operation of the relay 3 is not subject to material variations because of oscillations of the disc 6a. As impedances of this order correspond to faults close to the boundary of the section of the protected circuit controlled by the relay 3, the maximum accuracy of relay timing is required for such impedances. For faults well within the protected section or well beyond it, minor variations in the time of relay operation are of less importance, as there is sufficient difference in the time of operation of relays of adjacent sections to insure their operation in the correct sequence. It will, therefore, be seen that the minimum operating time, determined principally by the arc normally separating the contact members 4 and 5, and the variable time delay dependent upon the line impedance, determined principally by the speed of timing contact member 5, may be made quite small in a relay constructed in accordance with our invention, without materially affecting the ability of the relay to properly discriminate between faults within and without the protected section.

Figure 3:
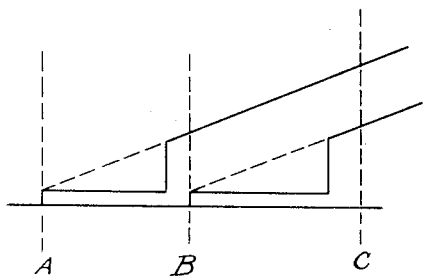
Figs. 3 and 4 are time-distance curves illustrating the operation of the relay shown in Fig. 2.
Figure 4:
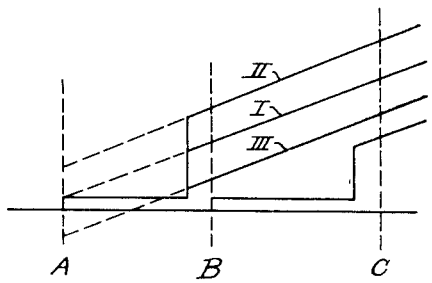

In some applications, it is desirable that the impedance relay have time-distance characteristics of the type illustrated in Figs. 3 and 4, in which the ordinates represent time and the abscissæ distance from the relay to the point of fault. In these figures, the boundaries of adjacent sections of the protected circuit are indicated by dotted vertical lines A, B and C. The impedance relays for each section operate with a substantially constant short time element for faults within a predetermined distance of the relay, and with an abruptly increased variable time element for faults beyond this distance.

Figure 2:
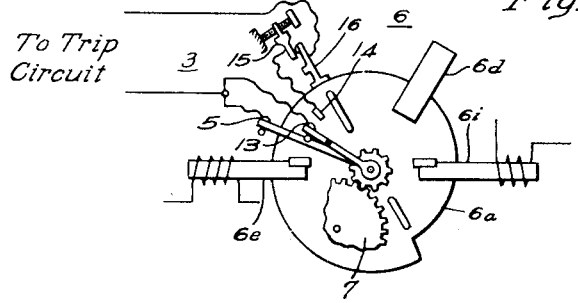
Fig. 2 is a diagrammatic fragmentary view of a modification of the relay shown in Fig. 1.

In order to obtain the characteristics shown in Figs. 3 and 4, the apparatus shown in Fig. 1 may be modified in the manner indicated in Fig. 2. In Fig. 2, the impedance-responsive element 6, clockwork mechanism 7 (shown fragmentarily), and the timing contact member 5 are constructed and arranged in the same manner as the corresponding elements of Fig. 1. The stop member 9 of Fig. 1, however, is not required in the Fig. 2 modification. Various elements of Fig. 1, such as the circuit breaker 1, protected circuit 2, and starting relay 10, which are the same in the Fig. 1 and Fig. 2 modifications, have for simplicity been omitted from Fig. 2.

In the Fig. 2 modification, an instantaneous contact member 13, for which there is no equivalent in Fig. 1, is mechanically connected to the clockwork mechanism 7 by any suitable means, such as a slip friction connection, in such a manner that its motion may be arrested without interfering with the motion of the timing contact member 5.

A contact member 14 is secured to the induction disc 6a in the arc of travel of the instantaneous contact member 13. The contact member 14 is connected to a stationary adjustable contact member 15 which also serves as a stop for limiting the rotation of the induction disc 6a in the counterclockwise direction by engagement with a movable contact member 16 secured to the disc 6a.

The contact member 15 is adjusted to a position corresponding to a definite impedance, such as $\frac{9}{10}$ of the impedance of the line section controlled by the relay.

The operation of the apparatus shown in Fig. 2 may be set forth as follows: Upon the occurrence of a fault within the operating range of the relay, operation of the clockwork mechanism 7 is initiated, and the voltage-driving magnet 6e is energized, as described above in connection with Fig. 1. If the impedance of the protected circuit to the point of fault is less than $\tfrac{9}{10}$ of the impendance of the section controlled by the relay, the induction disc 6a does not rotate, but exerts a torque which holds the contact member 16 in engagement with the adjustable contact member 15. At the expiration of a comparatively short time interval, the instantaneous contact member 13 engages the contact member 14 to complete the trip circuit and thereby trip open the circuit breaker (not shown).

If the impedance of the protected circuit to the point of fault is greater than $\tfrac{9}{10}$ of the impedance of the section controlled by the relay, the induction disc 6a rotates clockwise to a final angular position, as described above in connection with Fig. 1. The contact members 15 and 16 are accordingly separated, and engagement of the instantaneous contact member 13 with the contact member 14 is ineffective to complete the trip circuit.

At the expiration of a comparatively long variable time interval determined by the final angular position of the induction disc 6a, the timing contact member 5 engages the contact member 16 to complete the trip circuit and thereby trip open the circuit breaker.

It will be observed that the minimum operating time of the relay of Fig. 2 is determined by the arc traversed by the instantaneous contact member 13 in moving at constant speed from its initial position into engagement with the contact member 14. The minimum operating time of the relay is accordingly constant. By choosing various angular positions for the initial position of the timing contact member 5, the variable portion of the relay time-distance characteristic may be shifted in the direction of the time axis, as indicated at I, II, III in Fig. 4.

Referring to Fig. 5, which shows a directional impedance relay embodying our invention, the circuit breaker 1, protected circuit 2, timing contact member 5a, impedance responsive element 6, clockwork mechanism 7, release element 3, and starting relay 10 are arranged and connected as described above in connection with Fig. 1.

A stationary contact member 17, which also serves as a stop for limiting the rotation of the induction disc 6a in the counter-clockwise direction, is connected to a contact member 18 mounted on the induction disc 6a in the arc of travel of the timing contact member 5. A power directional relay element, shown diagrammatically at 19, is provided for preventing energization of the trip coil 1a when the power flow in the protected circuit 2 is in a predetermined direction. The power directional element 19 is provided with a bridging contact member 20, which is biased by means of a weak spring 21 to a position to engage both the contact members 17 and 18. The induction disc 6a, as in Figs. 1 and 2, is normally held in an angular position corresponding to a definite value of impedance.

When the power flow in the protected circuit 2 is in a predetermined direction, the power directional element 19 operates to compress the spring 21 and thereby move the contact member 20 out of engagement with the contact members 17 and 18. The circuit for the trip coil 1a accordingly cannot be completed regardless of operation of the remaining relay elements.

When the power flow to a fault in the circuit 2 is in the opposite direction, however, the bridging contact member 20 is held firmly in engagement with the stationary contact member 17, and the relay operates to complete the trip circuit after a time delay dependent upon the impedance of the circuit 2 to the point of fault. If the latter impedance is less than the definite value corresponding to the angular position of the contact member 17, the trip circuit is completed after a constant minimum time delay. If the impedance of the circuit 2 to the point of fault is greater than the value corresponding to the angular position of the contact member 17, the trip circuit is completed after a variable time delay, as explained above in connection with Figs. 1 and 2.

Fig. 6 shows an application of our invention to a plunger type relay having overcurrent and undervoltage inverse time element characteristics. In Fig. 6, the circuit breaker 1 and protected circuit 2 are shown as in Fig. 1. A contact arm 22 is mounted to be controlled by a tension spring 23 and a solenoid-and-plunger type voltage element 24 in such a manner that it may be moved through varying distances against the biasing force of the spring 23, depending upon the degree of energization of the voltage element 24. The contact arm 22 is provided with a contact member 25 located in the path of travel of a contact member 26, which is controlled by a tension spring 27 and a solenoid-and-plunger type overcurrent element 28 in a manner similar to the element 24. The overcurrent and voltage elements 28 and 24 are energized in accordance with the current and voltage, respectively, of the circuit 2, and are so designed that when the voltage of circuit 2 is above a predetermined percentage of normal, the contact member 25 is withdrawn beyond the path of movement of the contact member 26. When the voltage of circuit 2 is low, however, the contact member 26 may engage the contact member 25 at a variable position, depending upon the value of voltage and fault current of the circuit 2.

The contact arm 22 is also provided with a contact member 29 located in the path of travel of a timing contact member 30. A second timing contact member 31 is provided for cooperation with a stationary contact member 32 to determine the minimum operating time of the relay. The timing contact members 30 and 31 are mounted in any suitable manner for rectilinear motion under control of a pair of clockwork mechanisms 7a and 7b, respectively. The clockwork mechanisms 7a and 7b are provided with electromagnetic release elements 8a and 8b, respectively, of any suitable type, the coils of which are connected in a local circuit with a battery 33 and the contact members of a starting relay 34. The overcurrent element 28 and the starting relay 34 are energized in accordance with the current in the circuit 2 by any suitable means, such as a current transformer 12.

The operation of the apparatus shown in Fig. 6 may be set forth as follows: Upon the occurrence of a fault, the starting relay 34 closes to complete a circuit for the coils of the release elements 8a and 8b, and thereby initiate motion of the timing contact members 30 and 31 under control of the clockwork mechanisms 7a and 7b, respectively. At the same time, the overcurrent element 28 moves the contact member 26, against the bias of the spring 27, to a position corresponding to value of current in circuit 2.

If the voltage of the circuit 2, because of the fault condition, has decreased to a value sufficient to permit engagement of contact members 25 and 26, the trip circuit for the circuit breaker 1 is completed in a comparatively short definite time interval upon engagement of the timing contact member 31 with the stationary contact member 32.

If the voltage of circuit 2 has remained at a sufficiently high value to maintain the contact member 25 out of engagement with the contact member 26, the contact members 31 and 32 are ineffective to complete the trip circuit. At the expiration of a comparatively long time interval, the timing contact member 30 moves into engagement with the contact member 29 to thereby complete the trip circuit for the circuit breaker 1. As the position of the contact arm 22 under the latter conditions is determined solely by the voltage of the circuit 2, it will be seen that the relay operates with a variable time delay which increases with the voltage of the circuit 2. As the voltage available for the voltage element 24 increases approximately in proportion to the distance to the fault, the relay shown in Fig. 6 is capable of discriminatory action similar to that of the relay shown in Fig. 2.

We do not intend that the present invention shall be restricted to the specific structural details, arrangement of parts or circuit connections herein set forth, as various modifications thereof may be effected without departing from the spirit and scope of our invention. We desire, therefore, that only such limitations shall be imposed as are indicated in the appended claims.

We claim as our invention:

1. In a protective relay for use in a power system divided into sections, a fault-responsive element having a first movable member operable to a variable position dependent upon the value of a fault condition, a timing element having a second movable member operable at a substantially constant speed, means for restricting movement of said first movable member in one direction at an intermediate position corresponding to a fault near the junction of adjacent sections, fault responsive starting means for initiating operation of said fault responsive element and said timing element, and contact members operable in response to a predetermined positional relationship of said movable members, whereby the time required for operation of said contact members for fault conditions caused by faults near said junction is not materially affected by oscillations of said first movable member.

2. In a protective relay for use in a power system divided into sections, a fault-responsive element having a first movable member operable to a variable position dependent upon the value of a fault condition, a timing element having a second movable member operable at a substantially constant speed, a stop member for normally maintaining said first movable member at an intermediate position corresponding to a fault near the junction of adjacent sections, mechanism for withdrawing said stop member, fault responsive starting means for initiating operation of said fault-responsive element and said timing element and for rendering said mechanism effective, and contact members operable in response to a predetermined positional relationship of said movable members.

3. In a protective relay for use in a power system divided into sections, and impedance responsive element having a first movable member operable along a predetermined path to a variable position dependent upon the value of an impedance condition, a timing element having a second movable member operable along said path at a substantially constant speed, means for restricting movement of said first movable member in one direction at an intermediate position on said path corresponding substantially to an impedance quantity of the protected section, fault responsive starting means for initiating operation of said impedance responsive element and said timing element, and contact members operable in response to a predetermined positional relationship of said elements.

4. In a protective relay for use in a power system divided into sections, an impedance responsive element having a first movable member operable along a predetermined path to a variable position dependent upon the value of an impedance condition, a timing element having a second movable member operable along said path at a substantially constant speed, a stop member for maintaining said first movable member at an intermediate position on said path corresponding substantially to an impedance quantity of the protected section, mechanism for withdrawing said stop member, fault responsive starting means for initiating operation of said fault responsive element and said timing element and for rendering said mechanism effective, and contact members operable in response to a predetermined positional relationship of said movable members.

5. In a protective relay for use in a power system divided into sections, a fault responsive element having a movable member operable along a predetermined path to a variable position dependent upon the value of a fault condition, a stop member for restricting movement of said movable member in one direction at an intermediate position corresponding to a fault near the junction of adjacent sections, a second movable member operable along said path, a first pair of contact members operable in response to a predetermined positional relationship of said movable members, a second pair of contact members normally in circuit controlling relationship, timing means for moving said second movable member along said path at a substantially constant speed and for causing operation of said second pair of contact members in a comparatively short time interval, means effective upon separation of said first movable member and said stop member for rendering said second pair of contact members ineffective and for establishing circuit controlling relationship for said first pair of contact members, and fault responsive starting means for initiating operation of said fault responsive element and said timing means.

6. In a protective relay for use in a power system divided into sections, a fault responsive element having a first movable member operable to a variable position dependent upon the value of a fault condition, a timing element having a second movable member operable at a substantially constant speed, means for restricting movement of said first movable member in one direction at an intermediate position corresponding to a fault near the junction of adjacent sections, fault responsive starting means for initiating operation of fault responsive element and said timing element, contact members normally in circuit controlling condition and operable in response to a predetermined positional relationship of said movable members, and a power directional element for rendering said contact members ineffective in response to a predetermined directional power condition.

7. In a protective relay for use in a power system divided into sections, an impedance responsive element having a first movable member operable along a predetermined path to a variable position dependent upon the value of an impedance condition, a timing element having a second movable member operable along said path at a substantially constant speed, an adjustable stop member for restricting movement of said first movable member in one direction at an adjustable intermediate position on said path corresponding to an impedance condition within a predetermined range of values and contact members operable in response to a predetermined positional relationship of said movable members.

HERMANN NEUGEBAUER.
FRITZ GEISE.